United States Patent
Nio et al.

(10) Patent No.: US 8,902,368 B2
(45) Date of Patent: Dec. 2, 2014

(54) BASEBAND VIDEO DATA TRANSMISSION DEVICE AND RECEPTION DEVICE, AND TRANSCEIVER SYSTEM WITH REDUCED POWER CONSUMPTION BY INTERMITTENT TRANSMISSION RECEPTION OF A VIDEO SIGNAL

(75) Inventors: Yutaka Nio, Osaka (JP); Toshiro Nishio, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/353,144

(22) PCT Filed: Jan. 30, 2012

(86) PCT No.: PCT/JP2012/000565
§ 371 (c)(1),
(2), (4) Date: Apr. 21, 2014

(87) PCT Pub. No.: WO2013/076882
PCT Pub. Date: May 30, 2013

(65) Prior Publication Data
US 2014/0232940 A1    Aug. 21, 2014

(30) Foreign Application Priority Data

Nov. 25, 2011  (JP) .................................. 2011-257534
Dec. 5, 2011   (JP) .................................. 2011-265462

(51) Int. Cl.
| | | |
|---|---|---|
| H04N 5/38 | (2006.01) | |
| G06F 13/24 | (2006.01) | |
| G06F 13/26 | (2006.01) | |
| H04N 21/2343 | (2011.01) | |
| H04N 21/258 | (2011.01) | |

(52) U.S. Cl.
CPC ......... *H04N 5/38* (2013.01); *H04N 21/234381* (2013.01); *H04N 21/25825* (2013.01)
USPC .................. 348/723; 710/32; 710/48; 710/59

(58) Field of Classification Search
USPC .................. 348/723, 730, 552, 460, 73, 474, 348/476–479; 710/18, 32, 33, 46, 48, 59, 710/240, 260, 267; 455/343.1–343.3
See application file for complete search history.

(56) References Cited

U.S. PATENT DOCUMENTS 6,307,891 B1 * 10/2001 Hein et al. ..................... 375/285
7,557,801 B2 *  7/2009 Ozaki ............................ 345/204

(Continued)

FOREIGN PATENT DOCUMENTS

| JP | 2007-240741 | 9/2007 |
| JP | 2008-103806 | 5/2008 |

(Continued)

OTHER PUBLICATIONS

International Search Report issued Feb. 21, 2012 in International (PCT) Application No. PCT/JP2012/000565.

(Continued)

*Primary Examiner* — Victor Kostak
(74) *Attorney, Agent, or Firm* — Wenderoth, Lind & Ponack, L.L.P.

(57) ABSTRACT

In a transmission device: a controller performs a control of reading, from information regarding video specification, first information indicating whether a reception device is capable of intermittent reception of receiving a video signal at a timing that causes certain number of frames to be intermittent, and, when the reception device can perform intermittent reception, multiplexing, to the video signal during a blanking period of the video signal to be updated, an enable signal indicating the present video signal is to be enabled and second information indicating that transmission of the video signal will not resume unless the video signal is updated; and a transmitter transmits the video signal that is to be updated and then does not resume transmission of the video signal unless the video signal is updated.

7 Claims, 10 Drawing Sheets

(56) References Cited

U.S. PATENT DOCUMENTS

| | | | |
|---|---|---|---|
| 2004/0002327 A1* | 1/2004 | Tanaka | 455/418 |
| 2005/0259948 A1* | 11/2005 | Ando | 386/46 |
| 2006/0242669 A1* | 10/2006 | Wogsberg | 725/74 |
| 2006/0284793 A1* | 12/2006 | Park et al. | 345/55 |
| 2008/0065916 A1* | 3/2008 | Liu et al. | 713/320 |
| 2008/0084834 A1* | 4/2008 | Stanek | 370/284 |
| 2008/0180551 A1 | 7/2008 | Koike | |
| 2009/0033969 A1 | 2/2009 | Inoue | |
| 2009/0251479 A1* | 10/2009 | Choi et al. | 345/581 |
| 2010/0026790 A1 | 2/2010 | Ohba et al. | |
| 2010/0214480 A1* | 8/2010 | Kitamori | 348/554 |
| 2010/0253856 A1 | 10/2010 | Sato et al. | |

FOREIGN PATENT DOCUMENTS

| | | |
|---|---|---|
| JP | 2008-187536 | 8/2008 |
| JP | 2009-272778 | 11/2009 |
| WO | 2007/105548 | 9/2007 |

OTHER PUBLICATIONS

"High-Definition Multimedia Interface", Specification Version 1.3a, (Nov. 10, 2006, HDMI Licensing, LLC).

"A DTV Profile for Uncompressed High Speed Digital Interfaces", CEA Standard, CEA-861-D, (Jul. 2006, Consumer Electronics Association).

* cited by examiner

| Byte # | 7 | 6 | 5 | 4 | 3 | 2 | 1 | 0 |
|---|---|---|---|---|---|---|---|---|
| 0 | Vendor-specific tag code (=3) | | | Length (=N) | | | | |
| 1 | 24-bit IEEE Registration Identifier (0X 00 0C 03) (least significant byte first) | | | | | | | |
| 2 | | | | | | | | |
| 3 | | | | | | | | |

•
•
•

INTERMITTENT MODE

| n | DEFINED | DEFINED | DEFINED | ↓ | Rsvd (0) | Rsvd (0) |
|---|---|---|---|---|---|---|
| n+1 | DEFINED | | DEFINED | | | |
| n+2 | DEFINED | | | | | |
| ... | ... | | | | | |

FIG. 10 PRIOR ART

BASEBAND VIDEO DATA TRANSMISSION DEVICE AND RECEPTION DEVICE, AND TRANSCEIVER SYSTEM WITH REDUCED POWER CONSUMPTION BY INTERMITTENT TRANSMISSION RECEPTION OF A VIDEO SIGNAL

TECHNICAL FIELD

The present invention relates to a baseband video data transmission/reception system capable of transmitting and receiving at least baseband video data. In more detail, the present invention relates to a baseband video/audio data transmission/reception system capable of transmitting and receiving video data with low power consumption, and a transmission device and a reception device included in the system.

BACKGROUND ART

In recent years, HDMI standard has been known as a standard for baseband video/audio data transmission/reception systems. Baseband refers to be being uncompressed.

Video data is transmitted using three channels in HDMI standard. In addition, audio data or data used for control is time multiplexed to each video data and transmitted (e.g., cf. Non-Patent Literature 1 and Non-Patent Literature 2).

Figure 9:
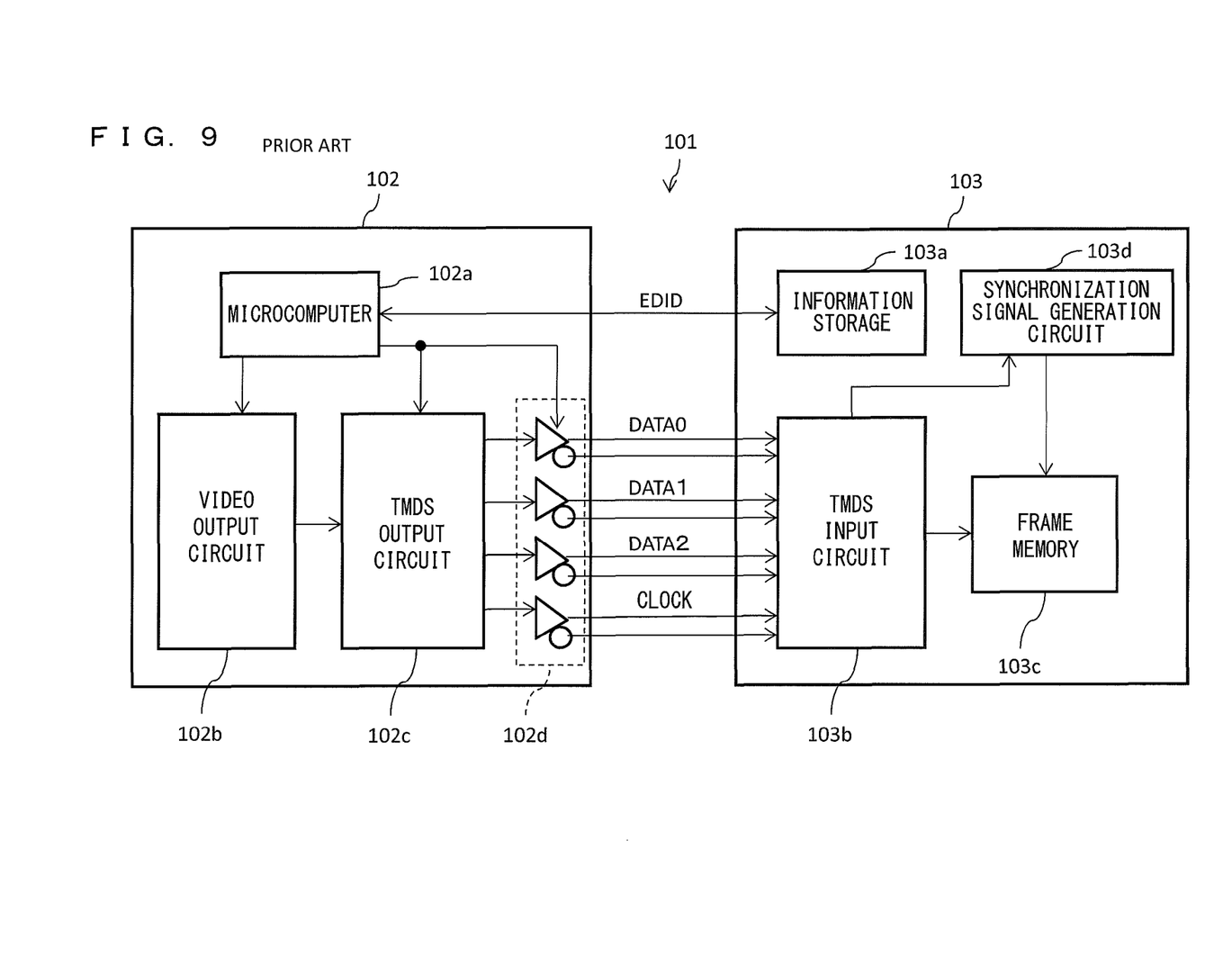
FIG. 9 shows a conventional technology, and is a block diagram showing a configuration of a transmission/reception system that performs transmission and reception through HDMI standard.

FIG. 9 shows the configuration of a transmission/reception system 101 having a configuration compliant with HDMI standard. The transmission/reception system 101 includes a transmission device 102 and a reception device 103. Digital cameras, video cameras, and DVD players etc., correspond to the transmission device 102, and television receivers and monitors etc., correspond to the reception device 103.

The transmission device 102 is a source device, and includes a microcomputer 102a, a video output circuit 102b, a TMDS output circuit 102c, and a transmitter 102d. The reception device 103 is a sink device, and includes an information storage 103a, a TMDS input circuit 103b, a frame memory 103c, and a synchronization signal generation circuit 103d.

In the transmission device 102, the microcomputer 102a reads, through a DDC (Display Data Channel), EDID (Extended Display Identification Data) stored in the information storage 103a formed with a ROM of the reception device 103, and examines which specification of HDMI standard that can be handled by the reception device 103. In the EDID, for example, video format in which the reception device 103 can display is described. The video format is specified by a VIC (Video Identification Code) (cf. Non-Patent Literature 2 for detail). The video format includes a resolution and a field rate.

In addition, the microcomputer 102a performs signal-processing control in the device, and, for example, performs a control of reading out recorded data from a recording medium included in the video output circuit 102b in the device and loading video data and audio data on a memory. The microcomputer 102a generates a digital video signal after receiving the EDID from the reception device 103, and generates a VIC specifying the video format of the digital video signal. The VIC is transmitted in a packet named AVI InfoFrame.

The TMDS output circuit 102c performs, for data of each transmission channel, rearranging, encoding, and parallel serial conversion of uncompressed data outputted from the video output circuit 102b. The transmitter 102d outputs serial data to a transmission path with TMDS (Transition Minimized Differential Signaling) method.

In the TMDS transmission path, three data channels (DATA0, DATA1, and DATA2) and one clock channel are used. In each data channel, video data of one of R-data, G-data, or B-data, or one Y-data, Cb-data, or Cr-data, audio data, and control data are converted to differential signals and transmitted by the transmitter 102d. The differential signal is a signal that represents Hi/Lo in a single signal as voltage difference of two signals. The video data is assigned to a display period and is transmitted as raster scan data. The audio data and the control data are assigned to a blanking period that is vertical blanking period and horizontal blanking period, and are transmitted as packet data. The control data is transmitted as an AVI InfoFrame packet.

In the reception device 103, the TMDS input circuit 103b receives TMDS data and clock from a receiver that is not shown, performs serial parallel conversion thereon, and then decodes each data. The decoded video data is outputted together with H-sync and V-sync signals and pixel clock generated by the synchronization signal generation circuit 103d, based on an analysis result of the transmitted clock and AVI InfoFrame packet. The audio data decoded by the TMDS input circuit 103b is used for outputting audio.

CITATION LIST

Non Patent Literature

[NPL 1] High-Definition Multimedia Interface Specification Version 1.3a (Nov. 10, 2006, HDMI Licensing, LLC)
[NPL 2] CEA-861-D (July 2006, Consumer Electronics Association)

SUMMARY OF THE INVENTION

Problems to be Solved by the Invention

However, with conventional technology, frames of the same image are continuously transmitted even when transmitting a still picture. In the transmission with the TMDS method, AC (alternating current) transmission is performed with NRZ (Non Return to Zero) method such that, for data of 1 and data of 0, current of plus and minus flow so as to switch within a twisted pair cable.

Figure 10:
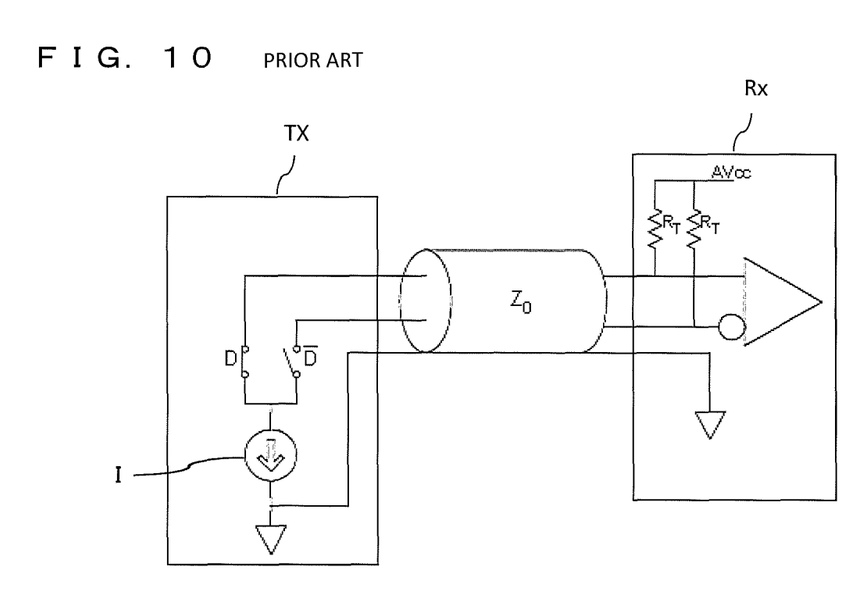
FIG. 10 shows a conventional technology, and is a circuit diagram showing a configuration of a transmission path for TMDS method.

As shown in FIG. 10, in a transmitter Tx, switching between two output terminals of open drain occurs in cases of data D and data /D to become ON-state. Current outputted from a current source I differs regarding whether to flow through which one of two termination resistances $R_T$ connected to differential inputs of a receiver Rx via a transmission path of characteristic impedance $Z_0$ between data D and data /D, and switching of plus and minus of differential input voltages occurs. The two termination resistances $R_T$ are connected to reference voltage AVcc.

In such manner, transmission in the TMDS method generates swinging of differential signals every time each data is transmitted and received. In addition, the numerical swing becomes extremely large since video signals of 8 bit are converted to 10 bits by a TMDS encoder in consideration of transmission property in TMDS. Therefore, since alteration of 1 and 0 repeatedly occurs for a large number of times while frames of the same image are continuously transmitted during still image display, wasteful power consumption occurs due to operation of the transmitter and the receiver, and power loss associated with charge and discharge through a cable occurs.

In addition, while the same image is repeatedly transmitted and received, since an encoder and a decoder for transmission/reception data repeat the same operation, wasteful power consumption increases.

In recent years, digital interfaces represented by the above described HDMI have been mounted on mobile devices such as digital cameras and smart phones to enable displaying of high definition videos. However, since mobile devices are driven by a battery, if output is performed for continuously displaying videos, power is consumed quickly associated with the wasteful power consumption as described above.

As described above, when transmitting baseband video data, power consumption of a physical interface that performs the actual transmission and reception becomes a problem.

An object of the present invention is to provide a transmission device and a reception device, and a transmission/reception system for baseband video data having high affinity with the conventional HDMI standard and capable of further reducing power consumption.

Solution to the Problems

A transmission device of the present invention is a transmission device configured to transmit, to a reception device, signals including a video signal. The transmission device includes: a controller configured to perform a control of reading information held by the reception device regarding a video specification that is supported, and transmitting the video signal that is supported by the reception device; and a transmitter configured to transmit the video signal in a form of baseband video data. When the reception device is in an output mode in which an identical image is extendedly shown in a predetermined number of multiple frames or more: the controller reads, from the information regarding the video specification, first information indicating whether the reception device is capable of intermittent reception of receiving the video signal at a timing that causes certain number of frames to be intermittent; and, when the reception device is capable of the intermittent reception, performs a control of multiplexing an enable signal indicating the present video signal is to be enabled and second information indicating that transmission of the video signal will not resume unless the video signal is updated, onto a blanking period of the updated video signal. The transmitter, after transmitting the updated video signal, does not resume transmission of the video signal unless the video signal is updated.

In the transmission device of the present invention, the transmitter, after transmitting the updated video signal, may stop transmission operation of at least the video data until the video signal is updated.

In the transmission device of the present invention, the transmitter may transmit a clock when the video data is transmitted, and may stop transmission operation of the clock while transmission operation of at least the video data is stopped.

In the transmission device of the present invention, the transmitter, after transmitting the updated video signal, may transmit invalid data in a transmission path of the video data until the video signal is updated.

In the transmission device of the present invention, the transmitter may transmit a clock when the video data is transmitted, and may also transmit the clock when the invalid data is transmitted.

A reception device of the present invention is configured to receive signals containing a video signal, and includes: a storage configured to store information regarding a video specification that is supported including first information indicating whether intermittent reception of receiving the video signal is possible at a timing that causes certain number of frames to be intermittent; a receiver configured to receive signals containing a video signal formed from baseband video data; a frame memory in which the video signal received by the receiver is written; and a synchronization signal generator configured to generate a first timing at which the video signal is written in the frame memory from the receiver, and a second timing at which the video signal is read out from the frame memory. The receiver may provide, to the synchronization signal generator and when an enable signal indicating the present video signal is to be enabled and second information indicating that transmission of the video signal will not resume unless the video signal is updated are superimposed during a blanking period of the received video signal, information indicating that the intermittent reception is executed. The synchronization signal generator may generate, in accordance with the information indicating that the intermittent reception is executed, the first timing that prevents writing the video signal in the frame memory as update until the receiver receives the updated video signal.

A transmission/reception system of the present invention includes a transmission device configured to transmit signals containing a video signal, and a reception device configured to receive signals containing the video signal. The transmission device includes: a controller configured to perform a control of reading information held by the reception device regarding a video specification that is supported by the reception device, and transmitting the video signal that is supported by the reception device; and a transmitter configured to transmit the video signal in a form of baseband video data. When the reception device is in an output mode in which an identical image is extendedly shown in a predetermined number of multiple frames or more: the controller may read, from the information regarding the video specification, first information indicating whether the reception device is capable of intermittent reception of receiving the video signal at a timing that causes certain number of frames to be intermittent; and, when the reception device is capable of the intermittent reception, may perform a control of multiplexing, on the videos signal during a blanking period of the updated video signal, an enable signal indicating the present video signal is to be enabled and second information indicating that transmission of the video signal will not resume unless the video signal is updated. The transmitter, after transmitting the updated video signal, may not transmit the video signal unless the video signal is updated. The reception device includes: a storage configured to store information regarding a video specification that is supported including the first information; a receiver configured to receive signals containing the video signal transmitted from the transmission device; a frame memory in which the video signal received by the receiver is written; and a synchronization signal generator configured to generate a first timing at which the video signal is written in the frame memory from the receiver and a second timing at which the video signal is read out from the frame memory. The receiver may provide, to the synchronization signal generator and when an enable signal indicating the present video signal is to be enabled and the second information are superimposed during a blanking period of the received video signal, information indicating that the intermittent reception is executed. The synchronization signal generator may generate, in accordance with the information indicating that the intermittent reception is executed, the first timing that prevents writing the video signal in the frame memory as update until the receiver receives the updated video signal.

Advantageous Effects of the Invention

With the transmission device and the reception device, and the transmission/reception system for baseband video data of the present invention, it is possible to provide a baseband video/audio data transmission/reception system that has high affinity with the conventional HDMI standard and is capable of further reducing power consumption.

DESCRIPTION OF EMBODIMENTS

First Embodiment

One embodiment of the present invention will be described in the following with reference to the drawings.

In the following, unless mentioned otherwise in particular, a general outline of a transmission device and a reception device compliant with HDMI standard will be described. Therefore, terms used in the following can be interpreted by referring to HDMI standard (Non-Patent Literature 1 and Non-Patent Literature 2) as appropriate.

Figure 3:
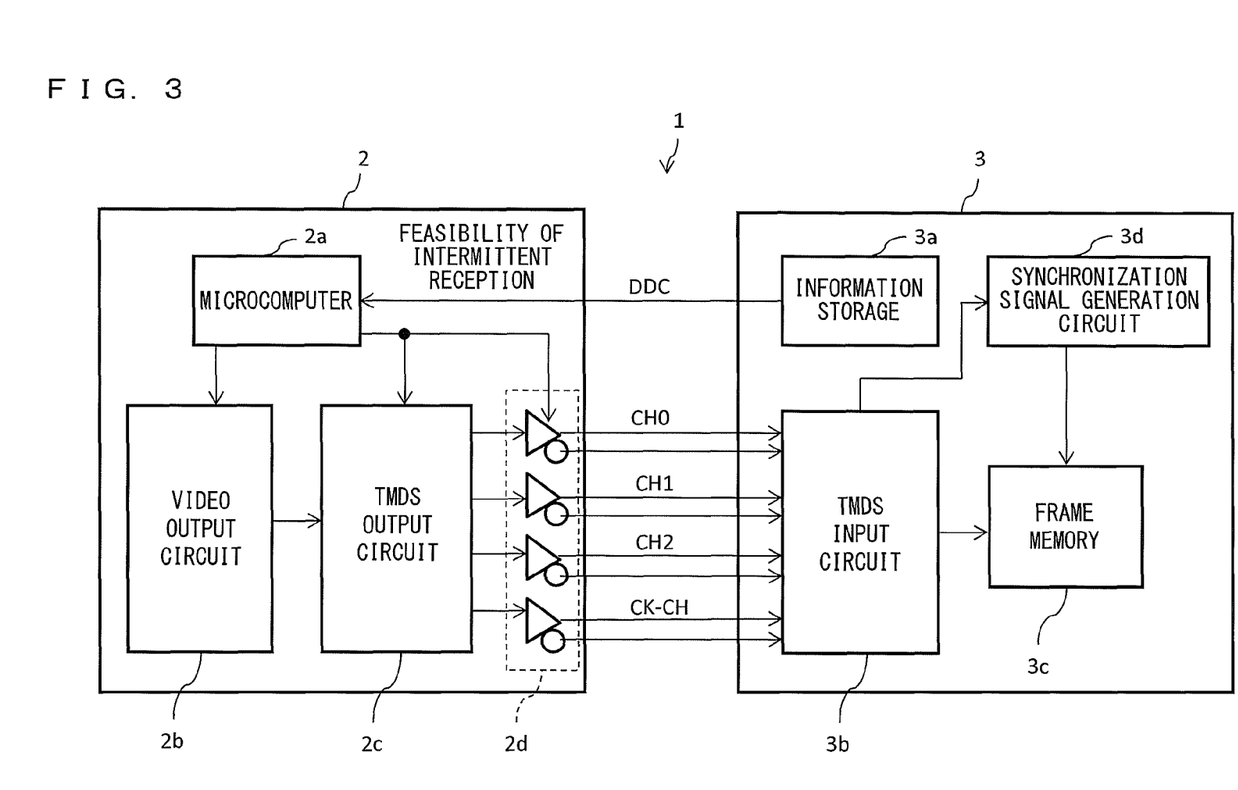
FIG. 3 shows an embodiment of the present invention, and is a block diagram showing a configuration of a transmission/reception system.

FIG. 3 shows a configuration of a transmission/reception system 1 for a video signal that is baseband video data, according to the present embodiment.

The transmission/reception system 1 includes a transmission device 2 and a reception device 3. Digital cameras, video cameras, smart phones, tablet terminals, and DVD players etc., correspond to the transmission device 2, and television receivers, monitors, HDMI repeaters, and HDMI distributors correspond to the reception device 3.

The transmission device 2 is a source device, and includes a microcomputer 2a, a video output circuit 2b, a TMDS output circuit 2c, and a transmitter 2d. The microcomputer 2a forms a controller; and the video output circuit 2b, the TMDS output circuit 2c, and the transmitter 2d form a transmitter. The reception device 3 is a sink device, and includes an information storage (storage) 3a, a TMDS input circuit (receiver) 3b, a frame memory 3c, and a synchronization signal generation circuit (synchronization signal generator) 3d.

Figure 1:
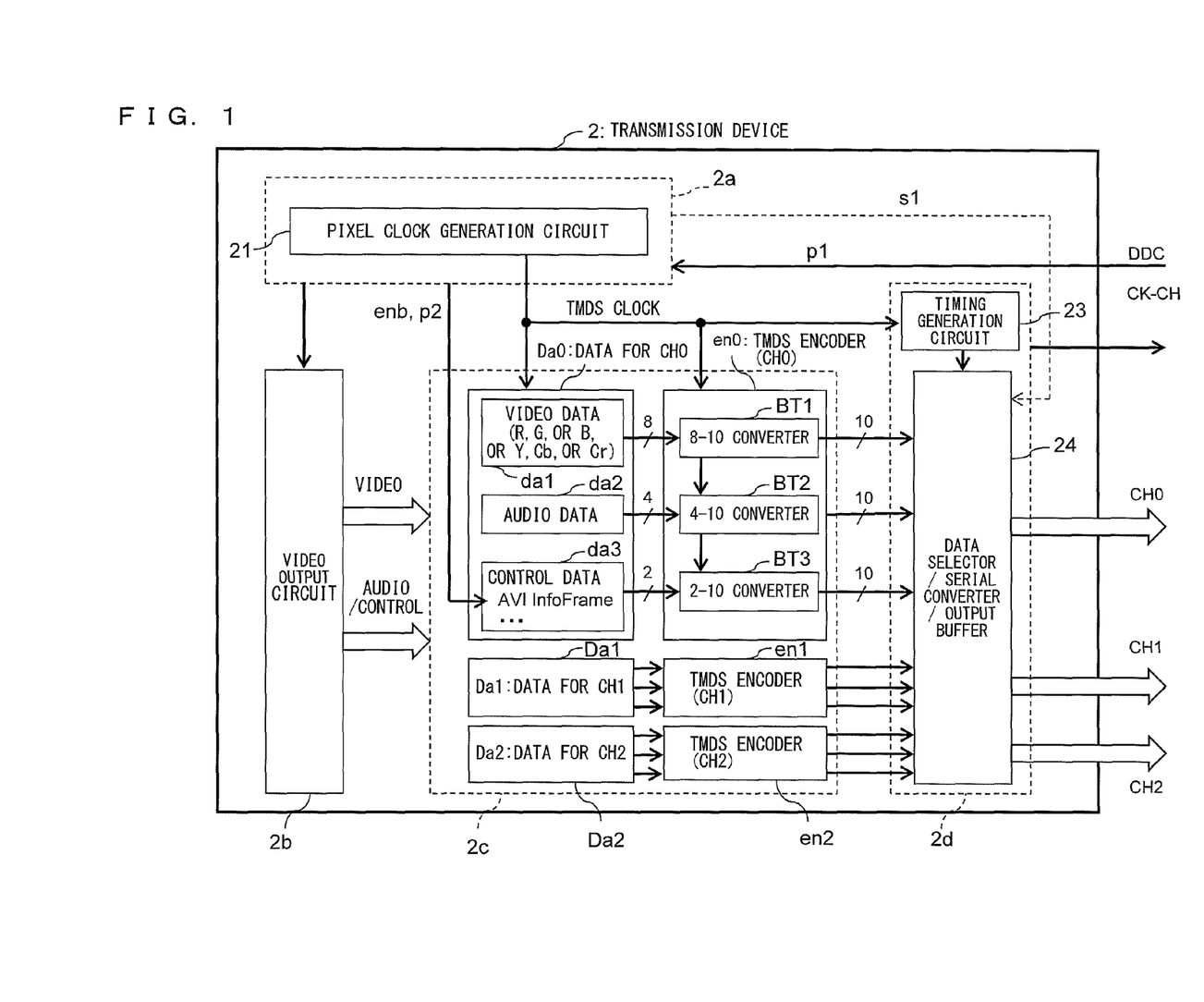
FIG. 1 shows an embodiment of the present invention, and is a block diagram showing a configuration of a transmission device.

FIG. 1 shows a detailed configuration of the transmission device 2.

The microcomputer 2a includes a pixel clock generation circuit 21, in addition to a processor and a register that are not diagrammatically represented. The pixel clock generation circuit 21 generates a pixel clock with a rate that matches the resolution of a video specification used as a reference, using an internal clock generated by an internal clock generation circuit of the microcomputer 2a. The pixel clock functions as a TMDS clock.

The microcomputer 2a reads an EDID from the reception device 3 under a control of the processor. The EDID contains first information p1 indicating whether or not intermittent reception of receiving the video signal is possible at a timing that causes certain number of frames to be intermittent. When the reception device 3 can perform intermittent reception, and when the transmission device 2 is in an output mode for showing the same image extended in a predetermined number of multiple frames or more, as in the cases with still images, paused videos of moving pictures, and a slow-motion reproduction video of moving pictures; the microcomputer 2a outputs, to the TMDS output circuit 2c, an enable signal enb indicating the present video signal is to be enabled and second information p2 indicating execution of an intermittent transmission mode in which transmission of the video signal will not resume unless the video signal is updated.

The video output circuit 2b loads video data and audio data on the memory in accordance with a control by the microcomputer 2a. These data are data loaded through decoding of compressed data read out from a recording medium included in the transmission device 2 and data inputted from outside.

The TMDS output circuit 2c includes a memory that retains data Da0 for channel CH0, data Da1 for channel CH1, and data Da2 for channel CH2. Data outputted from the video output circuit 2b are retained in the memories for each of the channels in accordance with a control by the microcomputer 2a. To the respective channels, transmission of video data da1 of R, G, or B, or Y, Cb, or Cr is assigned. Data of each of the channel contains the video data da1, audio data da2, and control data da3. The video data da1 of each of the channels is raster scan data assigned to a display period for display driving in the reception device 3. The audio data da2 and the control data da3 of each of the channel are packet data that are time multiplexed with a blanking period that is a vertical blanking period and a horizontal blanking period outside of a display period.

The control data da3 is generated in accordance with the content of video data or audio data by the video output circuit 2b. The control data da3 contains synchronization signal used for synchronizing videos, attribute data indicating attributes of video data and audio data, and control signal used for controlling the reception device 3.

The attribute data contains data referred to as InfoFrame which is information used for controlling the reception device 3. Of the InfoFrame, an InfoFrame referred to AVI Infoframe exists, which specializes in performing control using video data information. The VIC is data described inside the AVI InfoFrame. In the present embodiment, the second information indicating execution of the intermittent transmission mode is contained in a content represented by the VIC. The reception device 3 that has received the control data da3 displays videos in accordance with information described in the VIC.

When the TMDS output circuit 2c receives the enable signal enb and the second information p2 from the microcomputer 2a, the TMDS output circuit 2c adds data (flag) that describes the enable signal enb and the second information p2 in VIC to the control data da3.

As described above, for example, the data Da0 for the channel CH0 contains the video data da1, the audio data da2, and the control data da3 consisting of the synchronization signal and the attribute data, and is transmitted to the channel CH0 as described later. The data Da1 for the channel CH1 contains the video data da1, the audio data da2, and the control data da3 consisting of the control signal and the attribute data, and is transmitted to the channel CH1 as described later. The data Da2 for the channel CH2 contains the video data da1, the audio data da2, and the control data da3 consisting of the control signal and the attribute data, and is transmitted to the channel CH2 as described later. In a clock channel CK-CH, the TMDS clock is transmitted.

At a timing when the TMDS clock is outputted from the pixel clock generation circuit 21, the video data da1 of 8-bit parallel, the audio data da2 of 4-bit parallel, and the control data da3 of 2-bit parallel are read out in the TMDS output circuit 2c. The TMDS output circuit 2c includes a TMDS encoder en0 for the channel CH0, a TMDS encoder en1 for the channel CH1, and a TMDS encoder en2 for the channel CH2. The data Da0 for the channel CH0 is inputted to the TMDS encoder en0, the data Da1 for the channel CH1 is inputted to the TMDS encoder en1, and the data Da2 for the channel CH2 is inputted to the TMDS encoder en2.

Each of the encoders includes an 8-bit to 10-bit converter BT1, a 4-bit to 10-bit converter BT2, and a 2-bit to 10-bit converter BT3. The video data da1 is inputted to the 8-bit to 10-bit converter BT1 and is encoded into data in 10 bits. The audio data da2 is inputted to the 4-bit to 10-bit converter BT2 and is encoded into data in 10 bits. The control data da3 is inputted to the 2-bit to 10-bit converter BT3 and is encoded into data in 10 bits.

Each of the data encoded in 10 bits is outputted to the transmitter 2d. The transmitter 2d includes a timing generation circuit 23 and a data selector/serial converter/output buffer 24. The timing generation circuit 23 generates, from the TMDS clock outputted from the pixel clock generation circuit 21, a timing signal of data which the transmitter 2d outputs to a TMDS transmission path.

The data selector/serial converter/output buffer 24 selects the control data da3, the audio data da2, and the video data da1 which are parallel data in 10 bits at the timing of the TMDS clock, and arranges those in the order of transmission timing to convert those into serial data. Then, the data selector/serial converter/output buffer 24 outputs the generated serial data to the TMDS transmission path from an output buffer, one bit at a time, in accordance with the timing signal. The data selector/serial converter/output buffer 24 can be achieved by, for example, a serializer.

In the manner described above, each of the data is transmitted through the channel CH0 (DATA0), the channel CH1 (DATA1), and the channel CH2 (DATA2). Through the clock channel CK-CH, the TMDS clock that specifies a timing of every 10 bits is transmitted.

Then, when the intermittent transmission mode is executed, the microcomputer 2a transmits the video signal having added thereto the enable signal enb and the second information p2, and then performs a control of not transmitting the video signal unless the video signal is updated. In the present embodiment, transmission operations of at least video signals by the TMDS output circuit 2c and the transmitter 2d are stopped. In the present embodiment, transmission operation of the TMDS clock is also stopped, and transmission operations associate with audio data and control data in addition to the video signal are stopped. Examples of methods for stopping transmission operations include: transmitting a control signal s1 from the microcomputer 2a to the data selector/serial converter/output buffer 24 to set output of the output buffer of the transmitter 2d to a high impedance state; and blocking operation power to the output buffer.

The transmission operation is initiated again when the video signal is updated next, such as when a different still picture is outputted, when pausing of moving pictures is cancelled, and when slow-motion reproduction of a video is restored to normal reproduction. If the intermittent transmission mode is to be further executed after resuming the transmission operation, the enable signal and the second information are added to the video signal in manner similar to that described above.

Figure 2:
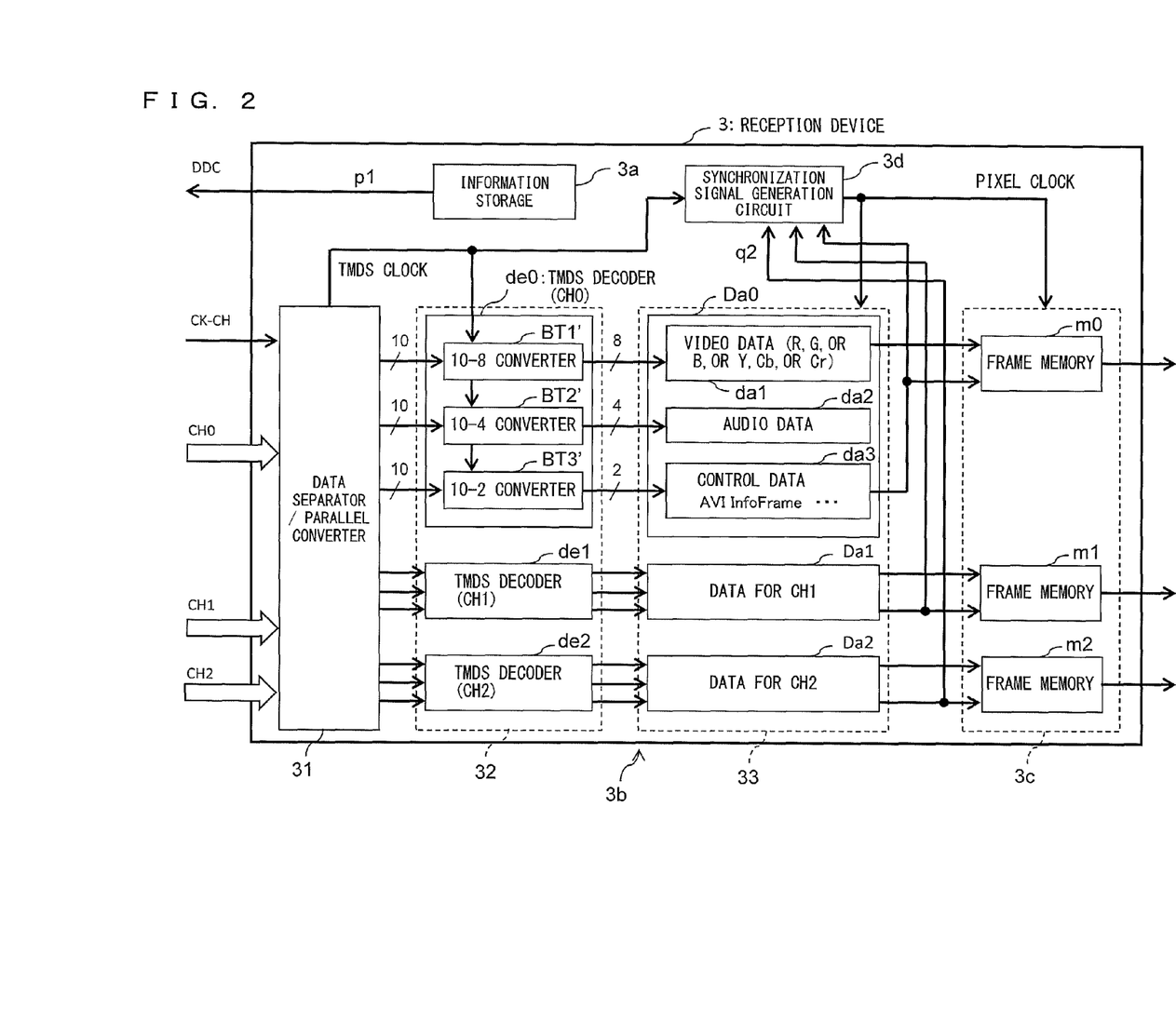
FIG. 2 shows an embodiment of the present invention, and is a block diagram showing a configuration of a reception device.

FIG. 2 shows a detailed configuration of the reception device 3.

The information storage 3a stores therein an EDID. In the EDID, information regarding video specification that is supported by the reception device 3, such as the video format, function, characteristics, and the like that can be handled by the reception device 3, are described. In the present embodiment, the first information p1 indicating whether the reception device 3 is capable of intermittent reception of receiving a video signal at a timing that causes certain number of frames to be intermittent is newly described in a VSDB (Vendor Specification Data Block) of the EDID. The described first information p1 is read out by the microcomputer 2a of the transmission device 2 through a DDC.

The TMDS input circuit 3b includes a data separator/parallel converter 31, a TMDS decoder 32, and a reception memory 33. The data separator/parallel converter 31 receives data via a TMDS transmission path by a receiver that is not diagrammatically represented, separates each of the received serial data that is in 10 bits by using the TMDS clock received from the clock channel, and converts that into parallel data using an internal clock. The data separator/parallel converter 31 outputs the TMDS clock to the TMDS decoder 32 and the synchronization signal generation circuit 3d. The data separator/parallel converter 31 can be achieved by, for example, a deserializer.

The TMDS decoder 32 decodes parallel data in 10 bits to parallel data in 8 bits. The TMDS decoder 32 includes a TMDS decoder de0 for the channel CH0, a TMDS decoder de1 for the channel CH1, and a TMDS decoder de2 for the channel CH2. The data for the channel CH0 is inputted to the TMDS decoder de0, and the data for the channel CH1 is inputted to the TMDS decoder de1, and the data for the channel CH2 is inputted to the TMDS decoder de2.

Each of the decoders includes a 10-bit to 8-bit converter BT1', a 10-bit to 4-bit converter BT2', and a 10-bit to 2-bit converter BT3'. The data for the channel CH0 is inputted to the 10-bit to 8-bit converter BT1' and is decoded into the video data da1 in 8 bits. The data for the channel CH1 is inputted to the 10-bit to 4-bit converter BT2' and is decoded into the audio data da2 in 4 bits. The data for the channel CH2 is inputted to the 10-bit to 2-bit converter BT3' and is decoded into the control data da3 in 2 bits. In the manner described above, the data Da0, Da1, and Da2 are decoded. There are cases where the TMDS decoder 32 properly processes the received video data based on the attribute data or the control signal.

The data Da0, Da1, and Da2 decoded to 8 bits are retained in the reception memory 33. The synchronization signal generation circuit 3d generates a pixel clock from the TMDS clock outputted from the data separator/parallel converter 31. In addition to that described above, the synchronization signal generation circuit 3d generates various timing signals used for display driving, including a vertical synchronization signal and a horizontal synchronization signal from information regarding the synchronization signal and the control signal received from the transmission device 2 and held by the control data da3.

The synchronization signal generation circuit 3d reads video data for a single frame from the reception memory 33 and writes the data in the frame memory 3c at a timing (first timing) of the generated pixel clock. The frame memory 3c includes a frame memory m0 in which the video data da1 of the data Da0 is written, a frame memory m1 in which the video data da1 of the data Da1 is written, and a frame memory m2 in which the video data da1 of the data Da2 is written.

When the enable signal enb and the second information p2 indicating execution of the intermittent transmission mode is added to the control data da3 during the blanking period of the received video signal, information q2 of the intermittent mode indicating intermittent reception is executed is provided from the reception memory 33 to the synchronization signal generation circuit 3d and the frame memory 3c based on the second information p2 read-out from the control data da3. As a result, the same video data da1 is retained in the frame memory 3c until data of an update frame is retained in the reception memory 33, and the same video data da1 is repeatedly read and used for N number of times to output video to a display device at a timing (second timing) of the pixel clock generated by the synchronization signal generation circuit 3d. The first timing is different from the second timing in that the first timing is a timing of a period excluding the duration in which the same video data da1 is retained in the frame memory 3c among the pixel clock.

Audio data da2 of the data Da0 to Da2 retained in the reception memory 33 are used for audio output.

The reception device 3 has an advantage of being able to use the configuration of a conventional reception device almost without any modifications, since the reception device 3 has a configuration obtained by merely adding the items described by the information storage 3a in the EDID.

(Configuration for Power Consumption Reduction)

In the following, it will be described how achieving power consumption reduction is made possible by adding information to the conventional HDMI standard, using the configuration shown in FIGS. 1 to 3.

In a transmission device compliant with HDMI standard, a frame rate is transmitted to a reception device using the VIC. Here, when the same image is extendedly outputted in a predetermined number of multiple frames or more as in the case with a still picture, the same image will be continuously displayed at the frame rate with conventional technology. However, with the present embodiment, when the reception device 3 can execute intermittent reception, the transmission device 2 executes the intermittent transmission mode and transmits the video signal added with the enable signal and the second information, and then does not resume transmission of the video signal unless the video signal is updated. Therefore, power consumption of a physical interface that actually performs the transmission and reception is reduced.

(Description of New Data to EDID)

Figure 4:
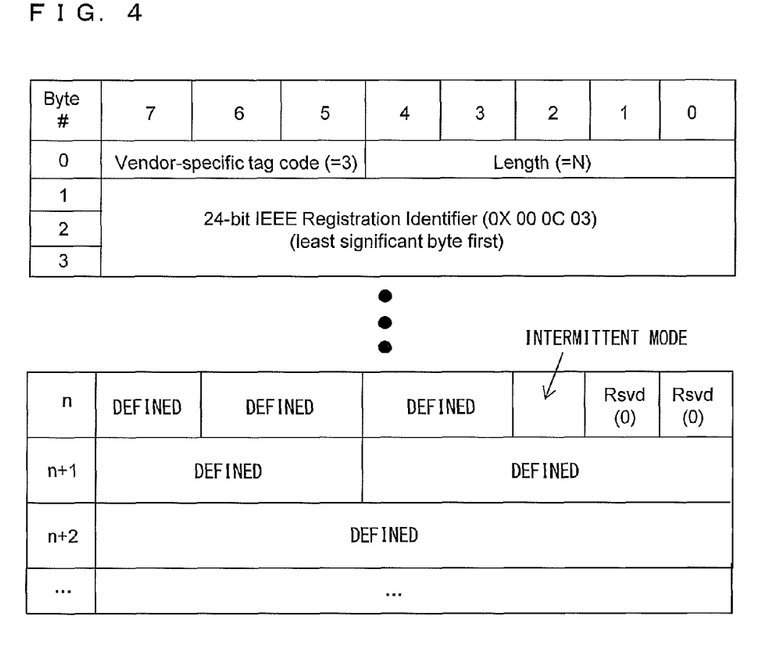
FIG. 4 is a figure for describing a content of EDID containing VSDB in which information of intermittent mode is defined.

FIG. 4 shows an illustrative example of a case in which the information storage 3a newly describes the first information p1 indicating whether or not intermittent reception is possible as an EDID. FIG. 4 shows the data structure of the VSDB. In the VSDB, byte blocks having a size of 1 byte are arranged in order, and header information, storage address, and the like are defined on the top block side. Reserved bit areas represented by Rsvd (0) exist in byte blocks shown subsequent to the n-th block in the low order. In the present embodiment, "intermittent mode" indicating that intermittent reception is possible is defined in the reserved bit areas using, for example, a single bit.

As described above, as a result of describing the first information p1 in the EDID to enable reading by the transmission device 2, it becomes possible to prevent the transmission device 2 from executing the intermittent transmission mode beyond the reception capacity of the reception device 3.

Figure 5:
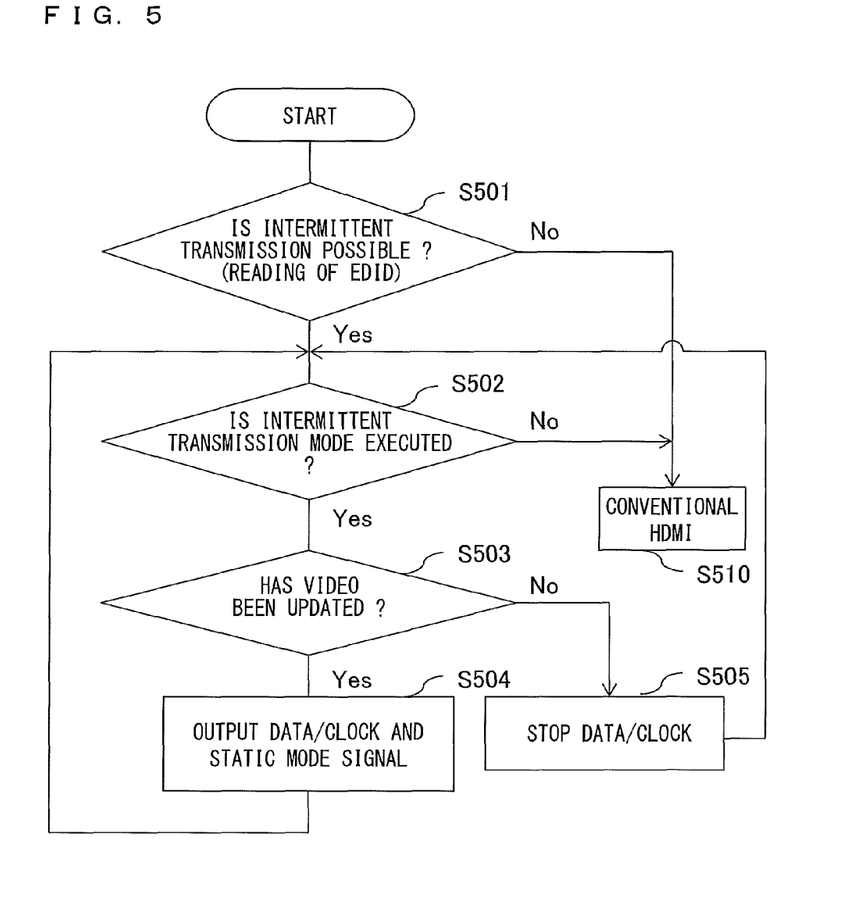
FIG. 5 is a flowchart describing operations of the transmission device in FIG. 1.

FIG. 5 shows a flowchart describing operations of the transmission device 2. These operations can be achieved by a control program or through hardware operations.

The microcomputer 2a reads whether reception is possible in the intermittent mode from the information storage 3a in the reception device 3 when power is turned on, when a cable is connected, or the like (step S501). As a result of the reading, when reception cannot be performed in the intermittent mode, it is determined that transmission should be performed with the conventional HDMI transmission method (S510). When the mode is one in which intermittent transmission is possible such as when output of the video output circuit 2b is a still picture or when the frame rate is low, transmission is initiated in the intermittent transmission mode of the present embodiment (S502).

The microcomputer 2a determines whether updating of video (enable) has occurred in a video output from a video output circuit 2b (S503). When updating of video (enable) has occurred; video data, clock, the enable signal enb and the second information p2 indicating execution of the intermittent transmission mode are outputted in a packet (InfoFrame) during the blanking period in accordance with a control by the microcomputer 2a (S504). When updating of video (enable) has not occurred, the supply of clock to the TMDS output circuit 2c is stopped, high impedance control or power supply cutoff is performed on an output buffer of the transmitter 2d by the control signal s1 (S505). When updating of video has not occurred, high impedance may be set only on a data line of the output buffer.

Figure 6:
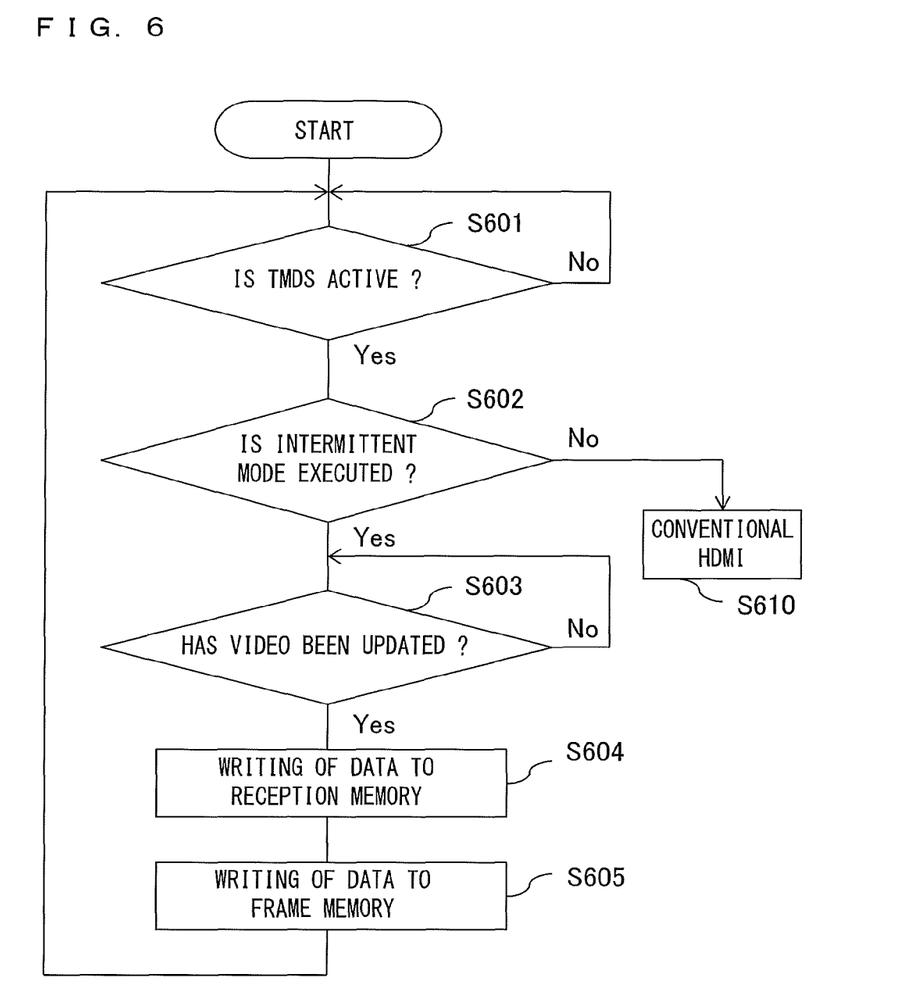
FIG. 6 is a flowchart describing operations of the reception device in FIG. 2.

FIG. 6 shows a flowchart describing operations of the reception device 3. These operations can be achieved by a control program or through hardware operations.

The TMDS input circuit 3b determines whether an input buffering section for TMDS transmission is active (S601). When the input buffering section is active, the TMDS input circuit 3b reads a signal showing whether the second information p2 indicating execution of the intermittent transmission mode is superimposed on the packet (InfoFrame) in the blanking period of the transmitted video signal (S602). When the intermittent transmission mode is not executed, the conventional HDMI reception is performed (S610).

When the TMDS input circuit 3b detects a flag indicating the intermittent transmission mode, the TMDS input circuit 3b reads whether the enable signal enb has been transmitted from the transmission device 2 (S603). When updating of video (enable) has occurred, the TMDS input circuit 3b writes a video image in an area n+1 of the reception memory 33 (S604). In writing the video signal to the frame memory 3c at this point, video data in an area n of the reception memory 33 stored in the memory in the previous updating of video (enable) is read out (S605).

When writing of the video signal to the reception memory 33 is completed, the video signal is read out from the frame memory 3c and displayed using the synchronization signal generated by the synchronization signal generation circuit 3d for displaying the video signal from the area n+1 in the reception memory 33.

By changing the read-out area after completing the writing into the reception memory 33, phenomena such as disarrangement of video signals due to passing and overtaking video signals can be prevented.

The configuration of the present embodiment also includes one in which the information storage 3a described in FIG. 1 is realized through communication by CEC (Consumer Electronics Control).

The present embodiment can also be applied for transitioning after level of a battery mounted on the transmission device is determined to be low. When the remaining level of the battery mounted on the transmission device is low, it is also possible to cull moving pictures and enter the intermittent operation mode of the present invention. At this moment, the transmission device may notify a user about entering the intermittent operation mode (power saving mode) of the present invention through a display means such as an OSD. Furthermore, a screen for allowing a user to select whether or not to enter the power saving mode may be displayed.

Second Embodiment

Another embodiment of the present invention will be described in the following with to reference the drawings.

Figure 7:
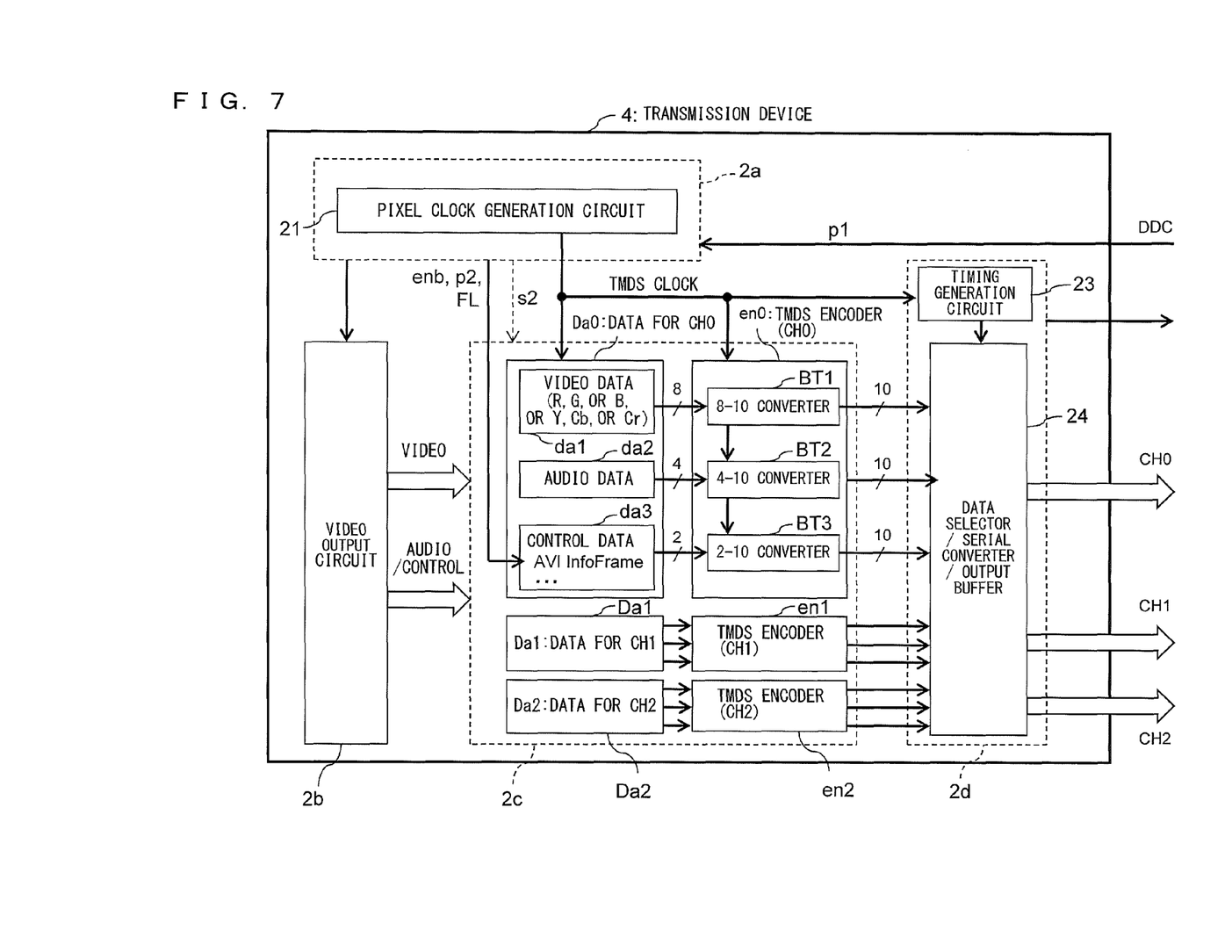
FIG. 7 shows another embodiment of the present invention, and is a block diagram showing a configuration of a transmission device.

A transmission/reception system according to the present embodiment has a configuration obtained by substituting, in the transmission/reception system 1 of FIG. 3, the transmission device with a transmission device 4 of FIG. 7.

The transmission device 4 in FIG. 7 is different from the transmission device 2 in FIG. 1 in that, when executing the intermittent transmission mode, the microcomputer 2a outputs a control signal s2 to the TMDS output circuit 2c, a video signal is not transmitted, and invalid data is transmitted.

The invalid data is data consisting of a pattern (e.g., a pattern of 10 bits represented by "1100110011") created such that the number of changing points of data in the intermittent transmission mode becomes a minimum, and is data obtained by adding an invalid flag FL=1 in the InfoFrame. The TMDS clock is transmitted as usual. The frame formed by the invalid data is a dummy frame, and although horizontal/vertical timing is specified similarly to ordinary TMDS transmission, coding such as half clock pattern etc., is provided for a display data section for reducing power consumption.

Figure 8:
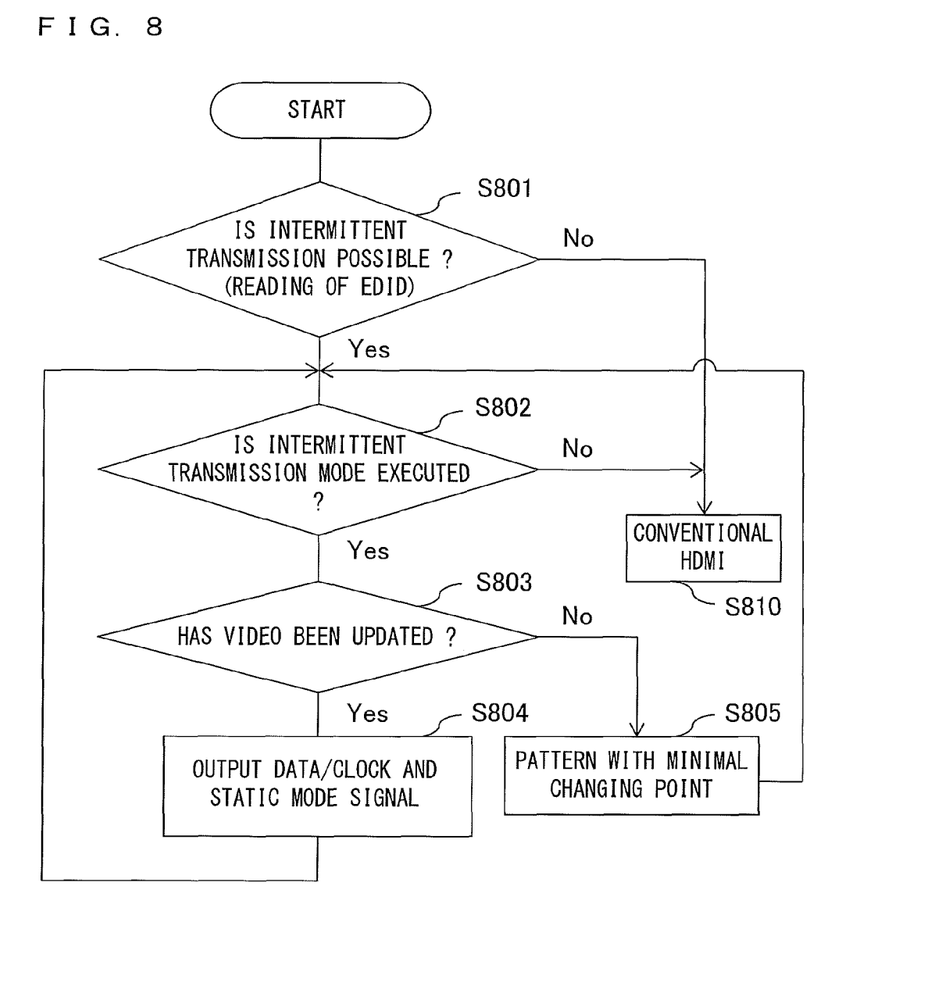
FIG. 8 is a flowchart describing operations of the transmission device in FIG. 7.

FIG. 8 shows a flowchart describing operations of the transmission device 4. These operations can be achieved by a control program or through hardware operations.

The microcomputer 2a reads whether the reception device 3 can receive in the intermittent mode from the information storage 3a in the reception device 3 when power is turned on, when a cable is connected, or the like (S801). As a result of the reading, when the reception device 3 cannot receive in the intermittent mode, the microcomputer 2a determines that transmission is possible in the HDMI transmission method shown in the conventional example (S810). When output from the video output circuit 2b is in a mode in which intermittent transmission is possible such as when a still picture is transmitted or when the frame rate is low, the intermittent transmission mode of the present embodiment is initiated (S802).

The microcomputer 2a determines updating of video (enable) has occurred in an output from the video output circuit 2b (S803). When updating of video (enable) has occurred; video data, clock, the enable signal enb and the second information p2 indicating execution of the intermittent transmission mode are outputted in a packet (InfoFrame) during the blanking period in accordance with a control by the microcomputer 2a (S804). When updating of video (enable) has not occurred, a pattern causing the number of changing points of data to be a minimum (a data stream of "1100110011" in the TMDS method) is outputted (S805).

It should be noted that the operation of the reception device 3 is identical to that in FIG. 6, and description thereof is omitted.

(Continuation of Clock Channel)

With the present embodiment, the clock transmitted in the clock channel is transmitted as the original clock of the video signal when the intermittent transmission mode is executed. That is, for example, in a case with a video at 1080p/60 Hz, the video signal clock has a clock speed of 148.5 MHz, and transmission continues at this clock also in the intermittent transmission mode. With this, it becomes possible to prevent failure caused by not being able to maintain stream continuity of a clock. For example, time and effort of HDCP re-authentication becomes unnecessary. Since the control data da3 contains the second information p2 and the reception device 3 side can recognize that intermittent reception should be performed, not having changes made to the transmission rate of the clock does not result in reception trouble.

Embodiments have been described above.

It should be noted that, when transmitting with a main link of uncompressed video data through a DP (DisplayPort), data may be inserted similarly to the blanking period. With DP, loading EDID from the sync to the source is performed in an AUX channel, and the clock channel does not exist since there is asynchronous transmission. In addition, during TMDS transmission of uncompressed video data performed with a DVI (Digital Visual Interface), data may be inserted similarly to the blanking period. With the DVI, loading EDID from the sync to the source is performed through a DDC (Display Data Channel). It is also possible to perform uncompressed data transmission that is not standard, or perform uncompressed data transmission through wireless communication.

In addition, a repeater may intermediate the communication between the transmission device and the reception device.

INDUSTRIAL APPLICABILITY

The present invention is particularly useful as a transmission method for transmitting a still picture in way compliant with the conventional HDMI standard.

DESCRIPTION OF THE REFERENCE CHARACTERS 1 transmission/reception system
2, 4 transmission device
2a microcomputer
3 reception device
3a information storage
3c frame memory
3d synchronization signal generation circuit
enb enable signal
p1 first information
p2 second information

The invention claimed is:

1. A transmission device configured to transmit, to a reception device, signals including a video signal, the transmission device comprising:
a controller configured to perform a control of reading information held by the reception device regarding a video specification that is supported, and transmitting the video signal that is supported by the reception device; and a transmitter configured to transmit the video signal in a form of baseband video data, wherein when the reception device is in an output mode in which an identical image is extendedly shown in a predetermined number of multiple frames or more, the controller reads, from the information regarding the video specification, first information indicating whether the reception device is capable of intermittent reception of receiving the video signal at a timing that causes certain number of frames to be intermittent, and, when the reception device is capable of the intermittent reception, performs a control of multiplexing an enable signal indicating the present video signal is to be enabled and second information indicating that transmission of the video signal will not resume unless the video signal is updated, onto a blanking period of the updated video signal, and the transmitter, after transmitting the updated video signal, does not resume transmission of the video signal unless the video signal is updated.

2. The transmission device according to claim 1, wherein the transmitter, after transmitting the updated video signal, stops transmission operation of at least the video data until the video signal is updated.

3. The transmission device according to claim 2, wherein the transmitter transmits a clock when the video data is transmitted, and the transmitter stops transmission operation of the clock while transmission operation of at least the video data is stopped.

4. The transmission device according to claim 1, wherein the transmitter, after transmitting the updated video signal, transmits invalid data, instead of the video signal, in a transmission path of the video data until the video signal is updated.

5. The transmission device according to claim 4, wherein the transmitter transmits a clock when the video data is transmitted, and the transmitter also transmits the clock when the invalid data is transmitted.

6. A reception device configured to receive signals containing a video signal, the reception device comprising:

a storage configured to store information regarding a video specification that is supported including first information indicating whether intermittent reception of receiving the video signal is possible at a timing that causes certain number of frames to be intermittent;

a receiver configured to receive signals containing a video signal formed from baseband video data;

a frame memory in which the video signal received by the receiver is written; and a synchronization signal generator configured to generate a first timing at which the video signal is written in the frame memory from the receiver, and a second timing at which the video signal is read out from the frame memory, wherein the receiver provides, to the synchronization signal generator and when an enable signal indicating the present video signal is to be enabled and second information indicating that transmission of the video signal will not resume unless the video signal is updated are superimposed during a blanking period of the received video signal, information indicating that the intermittent reception is executed, and the synchronization signal generator generates, in accordance with the information indicating that the intermittent reception is executed, the first timing that prevents writing the video signal in the frame memory as update until the receiver receives the updated video signal.

7. A transmission/reception system comprising: a transmission device configured to transmit signals containing a video signal, and a reception device configured to receive signals containing the video signal, the transmission device including:

a controller configured to perform a control of reading information held by the reception device regarding a video specification that is supported by the reception device, and transmitting the video signal that is supported by the reception device; and a transmitter configured to transmit the video signal in a form of baseband video data, wherein when the reception device is in an output mode in which an identical image is extendedly shown in a predetermined number of multiple frames or more, the controller reads, from the information regarding the video specification, first information indicating whether the reception device is capable of intermittent reception of receiving the video signal at a timing that causes certain number of frames to be intermittent, and, when the reception device is capable of the intermittent reception, performs a control of multiplexing an enable signal indicating the present video signal is to be enabled and second information indicating that transmission of the video signal will not resume unless the video signal is updated, onto a blanking period of the updated video signal, and the transmitter, after transmitting the updated video signal, does not resume transmission of the video signal unless the video signal is updated, and the reception device including:

a storage configured to store information regarding a video specification that is supported including the first information;

a receiver configured to receive signals containing the video signal transmitted from the transmission device;

a frame memory in which the video signal received by the receiver is written; and a synchronization signal generator configured to generate a first timing at which the video signal is written in the frame memory from the receiver and a second timing at which the video signal is read out from the frame memory, wherein the receiver provides, to the synchronization signal generator and when an enable signal indicating the present video signal is to be enabled and the second information are superimposed during a blanking period of the received video signal, information indicating that the intermittent reception is executed, and the synchronization signal generator generates, in accordance with the information indicating that the intermittent reception is executed, the first timing that prevents writing the video signal in the frame memory as update until the receiver receives the updated video signal.

* * * * *